United States Patent
Kyo

(10) Patent No.: US 8,635,432 B2
(45) Date of Patent: Jan. 21, 2014

(54) SIMD PROCESSOR ARRAY SYSTEM AND DATA TRANSFER METHOD THEREOF

(75) Inventor: Shorin Kyo, Tokyo (JP)

(73) Assignee: NEC Corporation, Tokyo (JP)

(\*) Notice: Subject to any disclaimer, the term of this patent is extended or adjusted under 35 U.S.C. 154(b) by 806 days.

(21) Appl. No.: 12/920,765

(22) PCT Filed: Mar. 4, 2009

(86) PCT No.: PCT/JP2009/054046
§ 371 (c)(1),
(2), (4) Date: Sep. 2, 2010

(87) PCT Pub. No.: WO2009/110497
PCT Pub. Date: Sep. 11, 2009

(65) Prior Publication Data
US 2011/0010524 A1 Jan. 13, 2011

(30) Foreign Application Priority Data

Mar. 4, 2008 (JP) ................................ 2008-053343

(51) Int. Cl.
*G06F 15/16* (2006.01)
*G06F 15/80* (2006.01)

(52) U.S. Cl.
USPC ........................................... 712/22; 712/225

(58) Field of Classification Search
None
See application file for complete search history.

(56) References Cited

U.S. PATENT DOCUMENTS

| 5,765,015 A | 6/1998 | Wilkinson et al. |
| 6,073,185 A | 6/2000 | Meeker |
| 2004/0215683 A1 | 10/2004 | Beaumont |

FOREIGN PATENT DOCUMENTS

| EP | 0314277 A2 | 5/1989 |
| JP | 6-75986 A | 3/1994 |
| JP | 7-28763 A | 1/1995 |
| JP | 7-36842 A | 2/1995 |
| JP | 2002108833 A | 4/2002 |
| JP | 2004234407 A | 8/2004 |
| JP | 2005267615 A | 9/2005 |
| JP | 2006344238 A | 12/2006 |

OTHER PUBLICATIONS

H. J. Siegel, "A Model of SIMD Machines and a Comparison of Various Interconnection Networks", IEEE Transactions on Computers, vol. C-28, No. 12, Dec. 1979, pp. 907-917.

(Continued)

*Primary Examiner* — Eric Coleman

(57) ABSTRACT

There is provided an SIMD processor array system in which data can be efficiently transferred between processor elements located at different distances. The SIMD processor array system includes a control processor (CP) that is capable of issuing a plurality of instructions at the same time, and a PE array that includes a plurality of mutually-connected processing elements (PEs) to be controlled by the CP. The CP issues an inter-PE data shift instruction to each PE. According to the inter-PE data shift instruction, each PE performs a data sending operation of copying all the contents of a transfer data storing part of an adjoining PE to a transfer data storing part (MBF) of the own PE, and a data fetch operation of copying part or all of the contents of the MBF of the adjoining PE to a transfer data fetch and storing part (RBUF) of the own PE if part of the contents the MBF of the adjoining PE coincide with the contents of an ID storing part (IDB) of the own PE.

10 Claims, 11 Drawing Sheets

(56) References Cited

OTHER PUBLICATIONS

International Search Report for PCT/JP2009/054046 mailed May 19, 2009.

S. Kyo et al., "A Video Recognition Processor for Intelligent Cruise Control Based on 128 4-Way VLIW RISC Processing Elements", Technical Report of IEICE, The Institute of Electronics, Information and Communication Engineers, Technical Committee on Integrated Circuts and Devices (ICD), May 2003, pp. 1-6.

The Extended European Search Report for EP Application No. 09717207.6 dated on Sep. 7, 2011.

```
AGAIN:
    /* ADDRESS A*/   SSFT
    /* ADDRESS A+1*/   BRC AGAIN,  %FFLG  ..   /* ADDRESS A+2*/   SSFT
    /* ADDRESS A+3*/
```

FIG.8

```
AGAIN:
    /* ADDRESS A*/ SSFT .. STC RADR, RCNT, RBUF, %RFLG .. LDC SADR, SCNT, SBUF, %SFLG
    /* ADDRESS A+3*/ BRC AGAIN, %FFLG .. SSFT .. STC RADR, RCNT, RBUF, %RFLG .. LDC SADR, SCNT, SBUF, %SFLG
    /* ADDRESS A+7*/ STC RADR, RCNT, RBUF, %RFLG
```

SIMD PROCESSOR ARRAY SYSTEM AND DATA TRANSFER METHOD THEREOF

This application is the National Phase of PCT/JP2009/054046, filed Mar. 4, 2009, which is based on and claims priority from prior Japanese Patent Application No. 2008-053343, filed 4 Mar. 2008, the entire contents of which are incorporated herein.

TECHNICAL FIELD

The present invention relates to an SIMD processor array system which includes a plurality of mutually-connected processing elements to be controlled by a control processor that is capable of issuing a plurality of instructions at the same time, and a data transfer method thereof.

BACKGROUND ART

SIMD (Single Instruction Multiple Data) processor array systems have conventionally been used for image processing of video signals and the like.

For example, NPL 1 presents an SIMD processor array which successively inputs and outputs image data at respective sides as shown in FIG. 12. Based on an SIMD control, each processing element (hereinafter, "PE") 510 applies an instruction broadcast from a control processor (hereinafter, "CP") 520 to the data on its own local memory, whereby parallel processing corresponding to the number of PEs is implemented. All the PEs simultaneously send data to other PEs located at the same distances in the same direction, and receive data delivered from other PEs at the same time. The inter-PE data transfer technology disclosed is the most common to SIMD processor arrays.

In order for future SIMD processor array systems to support a wider variety of more sophisticated applications, it is desired to provide a technology for more flexible data exchange between PEs. For example, PTL 1 discloses a technique for providing a transfer pattern of higher complexity. PTL 2 discloses a more effective method for using PE connection lines in a PE array of grid configuration.

CITATION LIST

Patent Literature

{PTL 1} JP-A-2005-267615
{PTL 2} JP-A-06-075986

Non-Patent Literature

{NPL 1} Shorin Kyo, "A Video Recognition Processor for Intelligent Cruise Control Based on 128 4-Way VLIW RISC Processing Elements," Technical report of IEICE (The Institute of Electronics, Information and Communication Engineers), Technical Committee on Integrated Circuits and Devices (ICD), May 2003, Vol. 103, No. 89, pp. 19-24

SUMMARY OF INVENTION

Technical Problem

The foregoing relevant technologies can be used to implement the function of receiving data from other PEs located at different distances or sending data to other PEs located at different distances. Since the PEs have different data transfer distances, however, the end timing of the transfer operation varies from one PE to another. Under the SIMD control, it is therefore not possible to move to the next operation or next instruction until all the PEs end their transfer operations. The time or the number of machine cycles needed for a single transfer is therefore typically proportional to the longest grid distance between transmitting and receiving PEs.

This means, for example, that the number of cycles needed to complete the entire data transfer processing is determined by L if there is any pair of PEs that transmits and receives at a transfer distance of L, when using an inter-PE network where each piece of transfer data can move by a grid distance of 1 at each cycle and the grid distance between the farthest PEs is L (L is a natural number greater than 1). Depending on the transfer pattern, there has been a problem that the mutual connection lines between the PEs, i.e., the inter-PE network often drops in availability.

The impact of such a problem on the processing performance can be somewhat alleviated, for example, by performing the data transfer between PEs in the background of the arithmetic processing of the PEs. In such a case, however, other problems can occur that it is needed to prepare a lot of hardware resources including buffers for temporarily storing the transfer data, and that it is not possible to flexibly support various types of data transfer schemes.

An object of the present invention is to provide an SIMD processor array system which includes a plurality of mutually-connected processing elements to be controlled by a control processor capable of issuing a plurality of instructions at the same time, in which each processing element performs data transfer with other processing elements located at different grid distances, which can be implemented with only a small amount of additional hardware resources, which can improve the availability of the network between the processing elements, and which can handle various data transfer schemes with high flexibility, and a data transfer method thereof.

Solution to Problem

To achieve the foregoing object, an SIMD processor array system according to the present invention includes: a control processor that is capable of issuing a plurality of instructions at the same time; and a processing element array that includes a plurality of mutually-connected processing elements to be controlled by the control processor, the control processor issuing an inter-processing element data shift instruction to the plurality of processing elements, the plurality of processing elements having a transfer data storing part, a transfer data fetch and storing part, and an ID storing part, and according to the inter-processing element data shift instruction, performing a data sending operation of copying all contents of the transfer data storing part of an adjoining processing element to the transfer data storing part of the own processing element, and a data fetch operation of copying part or all of the contents of the transfer data storing part of the adjoining processing element to the transfer data fetch and storing part of the own processing element if part of the contents of the transfer data storing part of the adjoining processing element coincide with contents of the ID storing part of the own processing element.

A data transfer method of an SIMD processor array system according to the present invention includes: issuing, with use of a control processor, an inter-processing element data shift instruction to a plurality of mutually-connected processing elements of a processing element array to be controlled by the control processor, the control processor being capable of issuing a plurality of instructions at the same time; and according to the inter-processing element data shift instruction, performing, with use of the plurality of processing elements, a data sending operation of copying all contents of a transfer data storing part of an adjoining processing element to a transfer data storing part of the own processing element, and a data fetch operation of copying part or all of the contents of the transfer data storing part of the adjoining processing element to a transfer data fetch and storing part of the own processing element if part of the contents of the transfer data storing part of the adjoining processing element coincide with contents of an ID storing part of the own processing element.

Advantageous Effects of Invention

According to the present invention, it is possible to provide an SIMD processor array system which includes a plurality of mutually-connected processing elements to be controlled by a control processor capable of issuing a plurality of instructions at the same time, in which each processing element performs data transfer with other processing elements at different grid distances, which can be implemented with only a small amount of additional hardware resources, which can improve the availability of the network between the processing elements, and which can handle various data transfer schemes with high flexibility, and a data transfer method thereof.

BRIEF DESCRIPTION OF DRAWINGS

FIG. 8 A diagram showing program code for explaining the operation of successively performing data transfer a plurality of times between PEs located at different distances in the SIMD processor array system according to the eighth example of the present invention.

FIG. 10 A diagram for explaining the result of operation at each cycle when successively performing data transfer a plurality of times between PEs located at different distances by using the destination ID method in the SIMD processor array system according to the eighth example of the present invention.

FIG. 11 A diagram that follows FIG. 10, explaining the result of operation at each cycle when successively performing data transfer a plurality of times between PEs located at different distances by using the destination ID method in the SIMD processor array system according to the eighth example of the present invention.

REFERENCE SIGNS LIST

Figure 1:
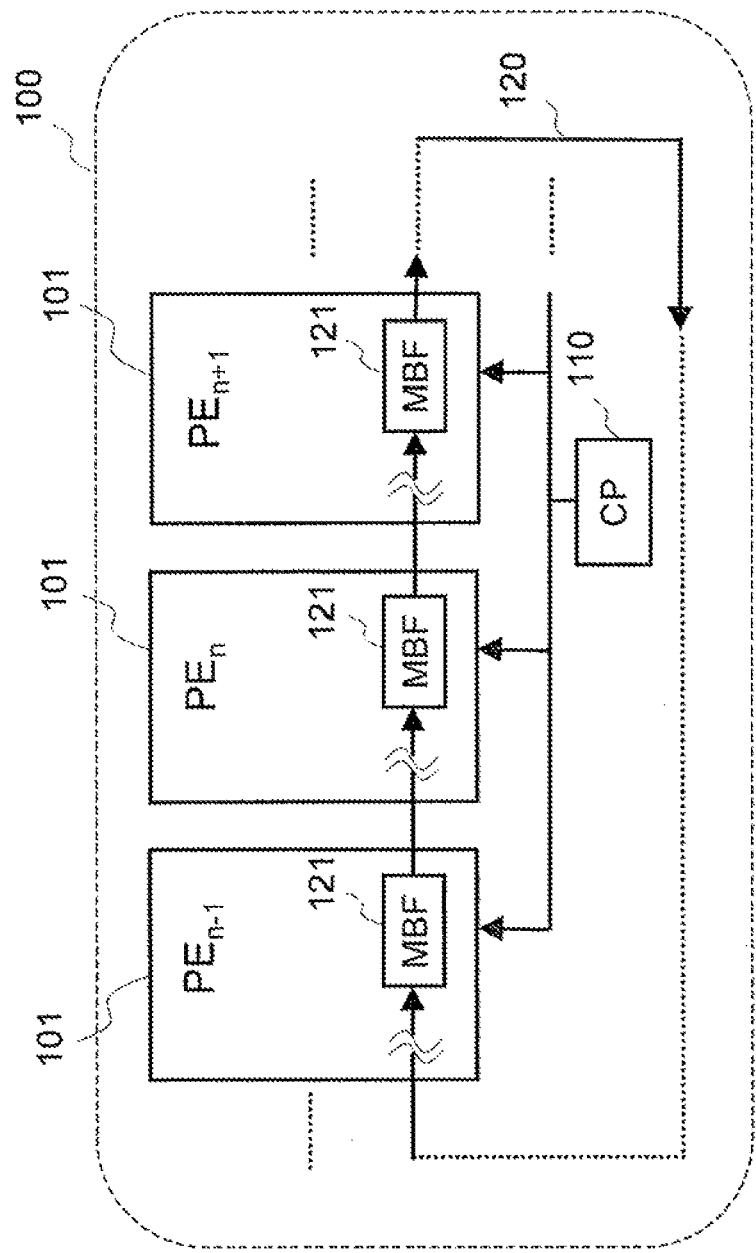
FIG. 1 A block diagram showing the general configuration of an SIMD processor array system according to first to eighth examples of the present invention.

100: SIMD processor array system
101: processing element (PE)
110: control processor (CP)
120: inter-PE connection network (connection line)
121: transfer buffer (MBF)
1211: transfer buffer (MBF) of an adjoining PE
200: transfer data
201: network control circuit (NCTL)
202: transmission number counter (SCNT)
203: reception number counter (RCNT)
204: reception buffer (RBUF)
205: transmission buffer (SBUF)
206: status value (STATUS)
207: mode register (MODE)
208: reception success flag (RFLG)
209: transmission success flag (SFLG)
210: ID buffer (IDB)
211: data transfer flag (FFLG)
220: group of arithmetic units
221: local memory (IMEM)
222: group of general-purpose registers and condition flags
301: combinational circuit part
302: SSFT instruction (inter-PE data shift instruction)
303: update values of RBUF, RFLG, and SFLG
304: update values of RCNT and SCNT
305: update value of MBF
411 to 415: first to fifth AND circuits
420: OR circuit
421 to 424: first to fourth OR circuits
431 to 435: first to fifth multiplexers (data selectors)
441 to 444: first to fourth decision circuits
451, 452: first and second subtractor circuits

DESCRIPTION OF EMBODIMENTS

Next, an SIMD processor array system and its data transfer method according to an exemplary embodiment of the present invention will be described in detail with reference to the drawings.

The SIMD processor array system according to the exemplary embodiment includes a processing element array (hereinafter, "PE array") which is composed of a plurality of mutually-connected processing elements (hereinafter, "PEs"), and a control processor (hereinafter, "CP") which issues instructions to the entire PE array and which is capable of issuing a plurality of instructions at the same time. The CP has a 1-bit data transfer flag (hereinafter, "FFLG"). The CP also has an inter-PE data shift instruction (hereinafter, "SSFT instruction") in its instruction set.

Each PE in the PE array includes, as storing units in the own PE, a transfer buffer (transfer data storing part) (hereinafter, "MBF"), a reception buffer (transfer data fetch and storing part) (hereinafter, "RBUF"), a transmission buffer (transmission data storing part) (hereinafter, "SBUF"), a reception number counter (hereinafter, "RCNT"), a transmission number counter (hereinafter, "SCNT"), an operation mode register (hereinafter, "MODE"), and an ID buffer (ID storing part) (hereinafter, "IDB"). Such storing units are configured by utilizing existing storing units such as general-purpose registers which typically exist in the PE data path.

Each PE in the PE array also includes, as storing units in the own PE, a reception success flag (hereinafter, "RFLG") and a transmission success flag (hereinafter, "SFLG"). Such storing units are configured by utilizing existing storing units such as condition flags which typically exist in the PE data path.

Each PE in the PE array further includes a network control circuit (hereinafter, "NCTL") as a control unit in the own PE. The NCTL inputs the contents of the foregoing storing units of the own PE and those of the MBF of an adjoining PE (hereinafter, referred to as "adjoining MBF") for each cycle, and controls the updating of the MBF, RBUF, RCNT, SCNT, RFLG, SFLG, and FFLG located in the own PE as specified by the SSFT instruction issued from the CP and according to the conditions to be described below. A counter method and a non-counter method (source ID method, destination ID method) to be designated by the MODE will be detailed later.

1) Update Control on MBF

If and only if "the SSFT instruction is executed in the same cycle," the NCTL updates the contents of the MBF with those of the SBUF when "the MODE has a value that designates a non-counter method, the SCNT has a non-zero value, and a validity-indicating field of the adjoining MBF has a value that indicates invalid," or when "the MODE designates a non-counter method, the SCNT has a non-zero value, and the contents of the RBUF are updated with those of the adjoining MBF." In other cases, the NCTL updates the contents of the MBF with those of the adjoining MBF.

2) Update of RBUF

If and only if "the SSFT instruction is executed in the same cycle," the NCTL updates the contents of the RBUF with those of the adjoining MBF when "the MODE has a value that designates a non-counter method, the RCNT has a non-zero value, and the value of the IDB coincides with the value of a portion of the adjoining MBF that represents ID," or when "the MODE designates a counter method, and the RCNT has a value smaller than the minimum grid distance (hereinafter, 'DIST') of the inter-PE network."

3) Update of RCNT

If and only if "the SSFT instruction is executed in the same cycle," the NCTL updates the value of the RCNT with that of the RCNT minus 1 (RCNT−1) when "the MODE has a value that designates a non-counter method, and the contents of the RBUF are updated with those of the adjoining MBF," and updates the value of the RCNT with that of the RCNT minus that of the DIST (RCNT−DIST) when "the MODE has a value that designates a counter method, and the RCNT has a value greater than or equal to DIST."

4) Update of SCNT

If and only if "the SSFT instruction is executed in the same cycle," the NCTL updates the value of the SCNT with that of the SCNT minus 1 (SCNT−1) when "the contents of the MBF are updated with those of the SBUF."

5) Update of RFLG If and only if "the SSFT instruction is executed in the same cycle," the NCTL updates the value of the RFLG to "1" when "the contents of the RBUF are updated with those of the adjoining MBF." In other cases, the NCTL updates the value of the RFLG to "0."

6) Update of SFLG

If and only if "the SSFT instruction is executed in the same cycle," the NCTL updates the value of the SFLG to "1" when "the contents of the MBF are updated with those of the SBUF." In other cases, the NCTL updates the value of the SFLG to "0."

7) Update of FFLG

If and only if "the SSFT instruction is executed in the same cycle," the NCTL updates the value of the FFLG to "1" when "any of the values of the RCNTs and those of the SCNTs in all PEs that participate in a data transfer operation is non-zero." In other cases, the NCTL updates the value of the FFLG to "0."

Hereinafter, the above-mentioned counter method and non-counter methods (source ID method, destination ID method) will be described.

A) Counter Method

In the exemplary embodiment, data transfer is performed by the "counter method" described below if the data to be transferred between PEs is a single piece of data and grid distance information from the source PE to the receiving PE is retained in the receiving PE. In such a case, data transfer between PEs located at different distances can be achieved with a network availability similar to that of the relevant technologies.

Prior to the issuance of the SSFT instruction, each of the PEs participating in the data transfer operation initially sets the following values into the storing units in the own PE.

a) MODE value: "1" which designates the "counter method"
b) RCNT value: the grid distance value from the own PE to the source PE of the data to receive
c) SCNT value: zero
d) The contents of the MBF: transmission data of the PE Next, the CP performs an instruction control to repeat issuing the SSFT instruction until the FFLG becomes "0," i.e., the values of the RCNTs in all the PEs that participate in the data transfer operation become zero. Consequently, the transmission data of each PE, which has been initially stored in the own MBF, is stored into the RBUF of the receiving PE.

As described above, the issuance of the SSFT instruction is repeated so that the transmission data is delivered to all the PEs participating in the data transfer operation from the respective desired other PEs located at certain relative grid distances.

B) Non-Counter Method

In the exemplary embodiment, data transfer is performed by either of the "non-counter methods" to be described below, "source ID method" or "destination ID method," if data transfer needs to be successively performed a plurality of times between PEs located at different distances. Consequently, a plurality of data transfer events can be performed in a superposed fashion, which improves the network availability and consequently makes it possible to reduce the total number of cycles needed to complete the transfer.

B-1) Source ID Method

If the ID information on the source PE is retained in the receiving PE, the data transfer is performed by the following "source ID method."

Prior to the issuance of the SSFT instruction, each of the PEs participating in the data transfer operation initially sets the following values into the storing units in the own PE.

a) MODE value: "0" which designates a "non-counter method"
b) RCNT value: the number of times of reception
c) SCNT value: the number of times of transmission
d) IDB value: the ID number of the source PE of the first piece of data to receive
e) The contents of the MBF: the first piece of transmission data
f) The contents of the SBUF: the next piece of transmission data Each piece of transmission data includes a "DATA" field, an "ID" field, and a "VALID" field which indicates validity. The fields contain the following values.
x) "DATA" field: the main body of the transmission data
y) "ID" field: the ID information on the own PE
z) "VALID" field: a value indicating "valid"

In PEs not participating in the data transfer operation, the contents of the MBF shall be set to transmission data whose "VALID" field indicates "invalid."

Next, the CP repeats issuing the SSFT instruction and the next conditional store instruction and conditional load instruction at each cycle until the FFLG becomes "0," i.e., both the values of the RCNTs and those of the SCNTs in all the PEs participating in the data transfer operation become zero.

When the conditional store instruction is issued, the NCTL of each PE saves the contents of the RBUF to a large-capacity storage area (hereinafter, referred to as "IMEM"), which is typically included in each PE, if the value of the RFLG is "1." When the conditional load instruction is issued, the NCTL of each PE loads the ID information on the source PE of the next piece of data to receive from the IMEM into the IDB if the value of the RFLG is "1." If the value of the SFLG is "1," the NCTL loads the next new piece of transmission data from the IMEM into the SBUF.

Consequently, SCNT pieces of transmission data of each PE, that have been initially stored in the own MBF, SBUF, and a predetermined location of the IMEM, are stored into a predetermined location of the IMEM and the RBUF of the receiving PE up to RCNT pieces of data for each PE.

B-2) Destination ID Method

If the ID information on the destination PE is retained in the originating PE, the data transfer is performed by the following "destination ID method."

Prior to the issuance of the SSFT instruction, each of the PEs participating in the data transfer operation initially sets the following values into the storing units in the own PE.
a) MODE value: "0" which designates a "non-counter method"
b) RCNT value: the number of times of reception
c) SCNT value: the number of times of transmission
d) IDB value: the ID number of the own PE
e) The contents of the MBF: the first piece of transmission data
f) The contents of the SBUF: the next piece of transmission data In each piece of transmission data, the fields contain the following values.
x) "DATA" field: the main body of the transmission data
y) "ID" field: the ID information on the destination PE
z) "VALID" field: the value indicating "valid"

In PEs not participating in the data transfer operation, the contents of the MBF shall be set to transmission data whose "VALID" field indicates "invalid."

Then, the CP repeats issuing the SSFT instruction and conditional store instruction and conditional load instruction at each cycle until the FFLG becomes zero, i.e., both the values of the RCNTs and those of the SCNTs in all the PEs participating in the data transfer operation become zero.

When the conditional store instruction is issued, the NCTL of each PE saves the contents of the RBUF to the IMEM if the value of the RFLG is "1." When the conditional load instruction is issued, the NCTL of each PE loads the next new piece of transmission data from the IMEM into the SBUF if the value of the SFLG is "1."

Consequently, SCNT pieces of transmission data of each PE, which have been initially stored in the own MBF, SBUF, and a predetermined location of the IMEM, are stored into a predetermined location of the IMEM and the RBUF of the receiving PE up to RCNT pieces of data for each PE.

As described above, the SIMD processor array system according to the exemplary embodiment includes the CP which is capable of issuing a plurality of instructions at the same time, and the PE array which includes a plurality of mutually-connected PEs to be controlled by the CP. The SIMD processor array system performs the following data transfer operation.

1) The CP issues the SSFT instruction to each PE. According to the SSFT instruction, each PE performs a data sending operation of copying all the contents of the MBF of an adjoining PE to the MBF of the own PE, and a data fetch operation of copying part or all of the contents of the MBF of the adjoining PE to the RBUF of the own PE if part of the contents of the MBF of the adjoining PE coincide with the contents of the ID storing part (IDB) of the own PE.

2) According to the SSFT instruction, each PE performs a data sending operation of copying the contents of the SBUF of the own PE to the MBF of the own PE if part of the contents of the MBF of the adjoining PE coincide with the contents of the IDB of the own PE or if the contents of the MBF of the adjoining PE are invalid, and copying all the contents of the MBF of the adjoining PE to the MBF of the own PE if not coincide.

3) According to the SSFT instruction, each PE performs the operation of setting the SFLG on the own PE ON if the contents of the SBUF of the own PE are copied to the MBF of the own PE.

4) According to the SSFT instruction, each PE performs a data fetch operation of copying part or all of the contents of the MBF of the adjoining PE to the RBUF of the own PE and decrementing the RCNT of the own PE by one if the RCNT of the own PE is non-zero and part of the contents of the MBF of the adjoining PE coincide with the contents of the IDB of the own PE.

5) According to the SSFT instruction, each PE performs the operation of setting the RFLG on the own PE ON if part or all of the contents of the MBF of the adjoining PE are copied to the RBUF of the own PE.

6) According to the SSFT instruction, each PE performs the operation of updating the FFLG on the CP so that the FFLG is ON if at least one of the RCNTs of the PEs participating in the data transfer operation is non-zero, and OFF if not.

7) According to the SSFT instruction, each PE performs the operation of updating the FFLG on the CP so that the FFLG is ON if at least one of the SCNTs of the PEs participating in the data transfer operation is non-zero, and OFF if not.

8) According to the SSFT instruction, each PE performs the operation of updating the FFLG on the CP so that the FFLG is ON if at least one of the RCNTs and SCNTs of the PEs participating in the data transfer operation is non-zero, and OFF if not.

9) According to the SSFT instruction, each PE performs any one of the foregoing operations 1) to 8) if the MODE contains an OFF value. If the MODE contains an ON value, each PE performs a data fetch operation of copying part or all of the contents of the MBF of the adjoining PE to the RBUF of the own PE and changing the RFLG to ON and the RCNT to zero when the RCNT of the own PE is smaller than the DIST to the adjoining PE and the RFLG is OFF, and decrementing the RCNT by the DIST when the RCNT is greater than or equal to the DIST.

Consequently, the exemplary embodiment provides the following effects.

A first effect is that when data transfer needs to be successively performed a plurality of times between PEs that are located at different distances, it is possible to use the network more efficiently as compared to the conventional method where all the PEs participating in the data transfer operation need to wait for the completion of transfer upon each data transfer.

The reason is that the use of the foregoing "source ID method" or "destination ID method" allows each PE to submit valid transmission data to the MBF immediately and autonomously if the MBF is unoccupied and the PE still has data to transfer. This makes it possible to minimize the numbers of cycles of the inter-PE links that connect buffers and MBFs occupied by already-received transfer data or invalid transfer data.

A second effect is that it is possible, in addition to the first effect, to achieve a processing efficiency equivalent to that of the conventional schemes even when data transfer needs to be performed only once between PEs that are located at different distances.

The reason is that with the configuration of the present invention, it is possible to transfer a single piece of data by using the counter method which has the highest MBF bit-width use efficiency.

A third effect is that it is possible without much additional hardware resources to implement the function of selecting the data transfer scheme through program switching depending on the presence and positional statuses of transmission and reception information, such as the "destination ID method" if the originating PE retains the ID of the receiving PE, the "source ID method" if otherwise the receiving PE retains the ID information on the originating PE, and the "counter method" if a single piece of data is to be transferred and the receiving PE retains the grid distance information from itself to the originating PE.

The reason is that the explicit issuance of the SSFT instruction for each single unit of transfer operation makes it possible to utilize existing storing units for the storing units of each PE, while easily avoiding use conflict between the resources. The foregoing schemes can thus be implemented by the addition of only a simple control circuit as compared to when the schemes are individually implemented by respective background operations.

Next, specific examples will be described with reference to the drawings.

Example 1

Initially, a first example of the present invention will be described.

Figure 2:
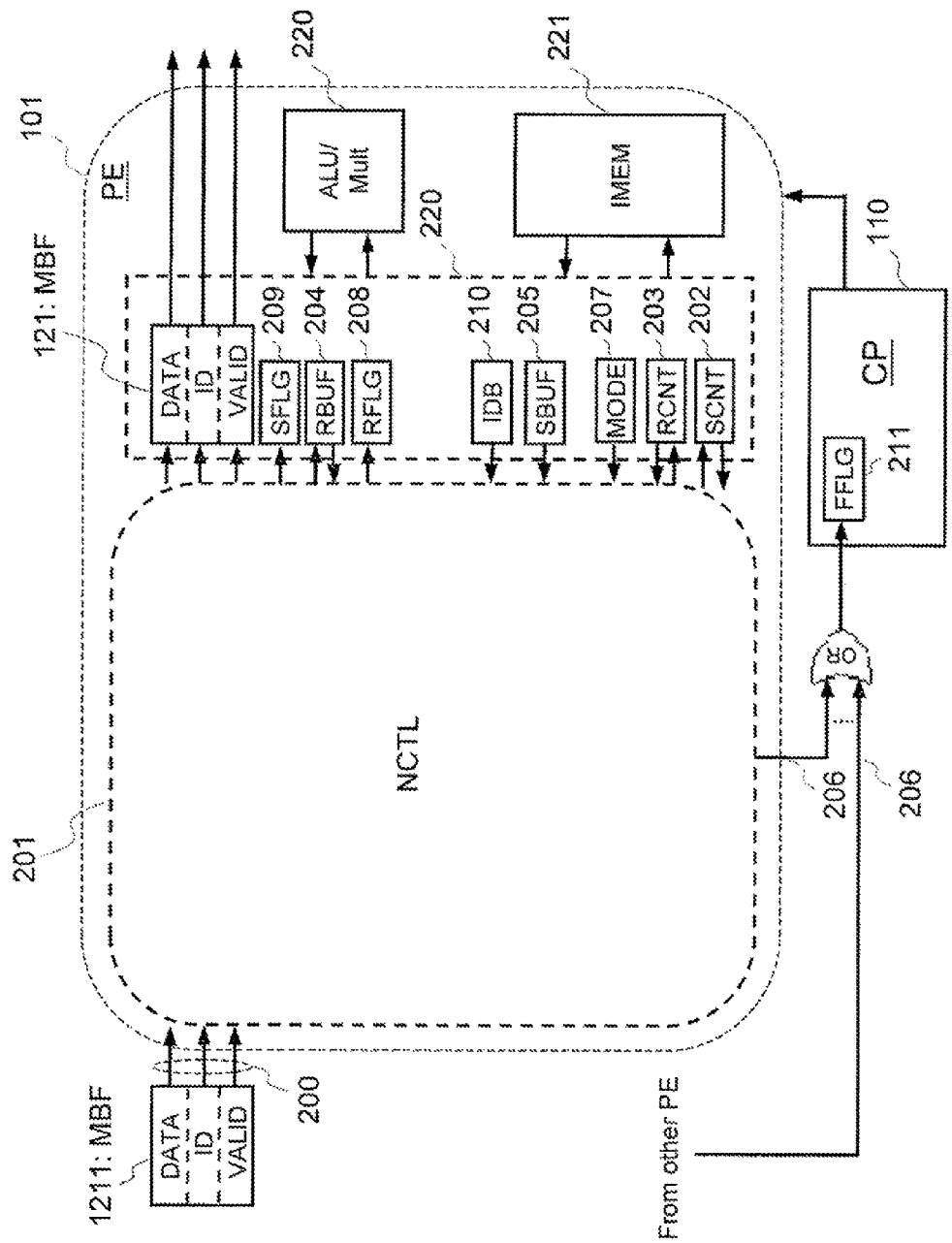
FIG. 2 A block diagram showing the connections between main components of the SIMD processor array system according to the first to eighth examples of the present invention.

Referring to FIGS. 1 and 2, an SIMD processor array system according to the present example includes a processing element array (hereinafter, "PE array") 100 which includes a plurality of processing elements (hereinafter, "PE") 101, and a control processor (hereinafter, "CP") 110 which supplies a plurality of instructions including an inter-PE data shift instruction (hereinafter, "SSFT instruction") to the PE array 100.

The PEs 101 in the PE array 100 are mutually connected so that two adjoining PEs 101 are connected to each other by a network or an inter-PE connection line 120 through a transfer buffer (transfer data storing part) (hereinafter, "MBF") 121 which is included in each PE 101.

Referring to FIG. 2, the PE 101 includes, as typically existing components, an arithmetic unit (ALU/Mult) 220 which performs arithmetic operations, a set of general-purpose registers and a group of condition flags 222, and a large-capacity local memory (hereinafter, "IMEM") 221 of several KBs for data storage.

Aside from such components, the PE 101 includes, as storing units for use in executing the SSFT instruction, a mode register (hereinafter, "MODE") 207, a transmission counter (hereinafter, "SCNT") 202, a reception counter (hereinafter, "RCNT") 203, a reception buffer (hereinafter, "RBUF") 204, a transmission buffer (hereinafter, "SBUF") 205, a reception success flag (hereinafter, "RFLG") 208, a transmission success flag (hereinafter, "SFLG") 209, and an ID buffer (hereinafter, "IDB") 210 in addition to the MBF 121. Such storing units are configured by utilizing the existing general-purpose registers and group of condition flags 222 mentioned above.

As shown in FIG. 2, the contents of the MBF 121 are classified into three fields "DATA," "ID," and "VALID." The three fields may be collectively regarded as a single "DATA" field (="ALLDATA" field). In FIG. 2, the reference Min 1211 designates the MBF of the adjoining PE 101.

Aside from the foregoing components, the PE 101 has a network control circuit (hereinafter, "NCTL") 201. The NCTL 201 inputs transfer data 200 that is input from the MBF 1211 of the adjoining PE 101 and the values that are stored in the storing units including the MODE 207, RCNT 203, SCNT 202, RBUF 204, SBUF 205, and IDB 210. The NCTL 201 outputs the update values of the respective storing units when the SSFT instruction is issued by the CP 110, and a 1-bit status value (hereinafter, STATUS") 206 of either "0" or "1."

The STATUS 206 is output from each PE 101 that participates in the data transfer operation, and input to an OR circuit 420 which is arranged in the prior stage of the CP 110. The OR circuit 420 ORs the STATUSes 206 from all the PEs 101, and outputs "0" if all the values of the STATUSes 206 are "0," and "1" if not. The output is input to the CP 110 and used as the update value of a data transfer flag (hereinafter, "FFLG") 211 on the CP 110.

Now, the operation of the present example will be described with reference to FIG. 3.

Figure 3:
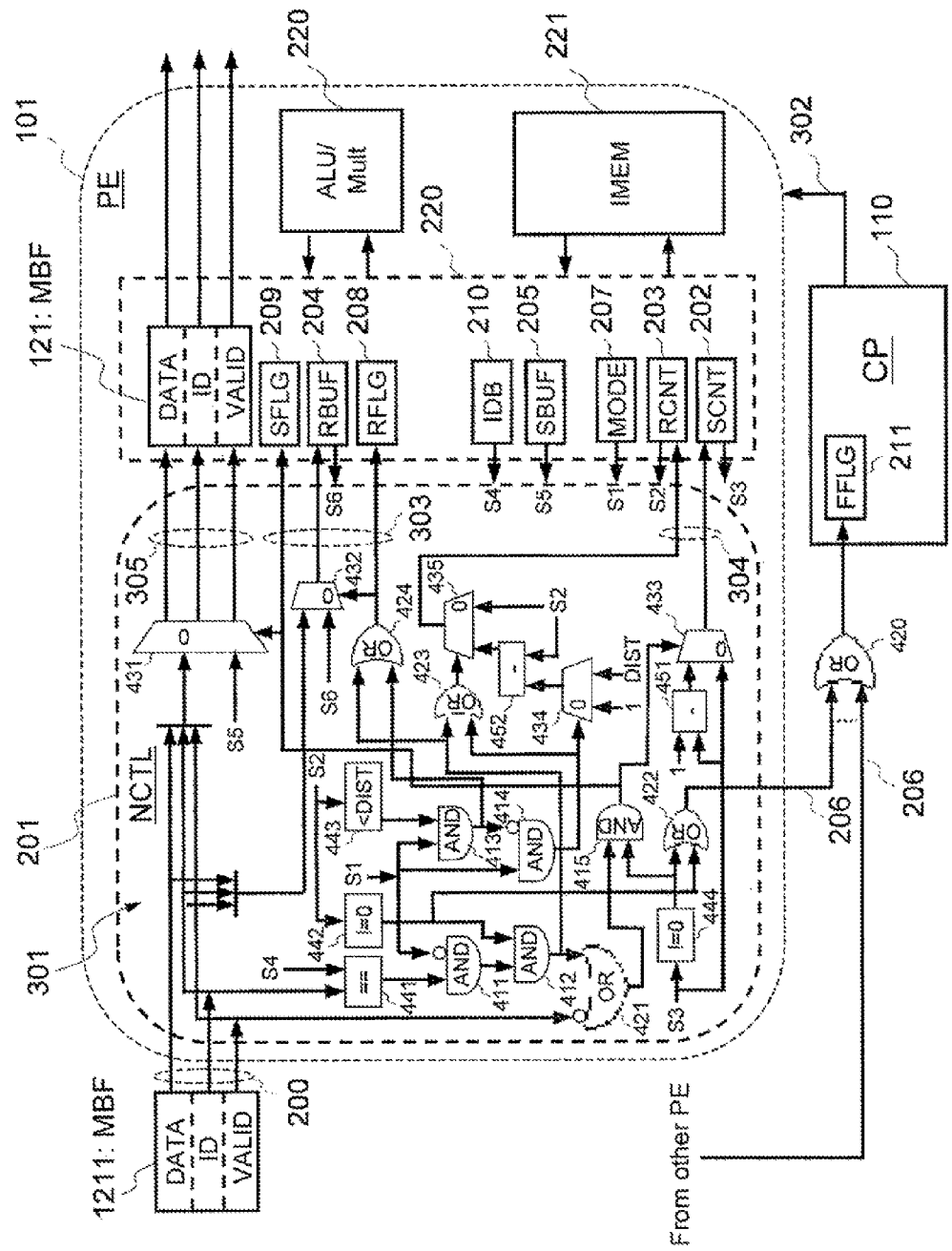
FIG. 3 A block diagram showing the configuration of a control circuit of the SIMD processor array system according to the first to eighth examples of the present invention.

Referring to FIG. 3, the NCTL 201 is composed of a combinational circuit part 301 for generating network control signals. The combinational circuit part 301 shown in the diagram includes first to fifth AND circuits 411 to 415, first to fourth OR circuits 421 to 424, first to fifth multiplexers (data selectors) 431 to 435, first to fourth decision circuits 441 to 444, and first and second subtractor circuits 451 and 452. It should be noted that the configuration of the combinational circuit part 301 shown in the diagram is just an example, and any configuration may be applied as long as the same functions can be implemented.

The first decision circuit 441 inputs both the value of the "ID" field in the transfer data 200 of the adjoining MBF 1211 of the adjoining PE 101 and the value S4 of the IDB 210, decides the equality between the two inputs (whether or not the value of the "ID" field is equal to the value S4 of the IDB 210), and outputs "1" if the two inputs are equal, and "0" if not equal. The output is input to the first AND circuit 411.

The second decision circuit 442 inputs the value S2 of the RCNT 203, decides the equality between S2 and zero (whether the value S2 of the RCNT 203 is non-zero or not), and outputs "1" if S2 is non-zero, and "0" if zero. The output is input to the second AND circuit 412 and the second OR circuit 422.

The third decision circuit 443 inputs the value S2 of the RCNT 203, decides the relationship in magnitude between the values of S2 and DIST (whether or not the value S2 of the RCNT 203 is smaller than the value of DIST), and outputs "1" if S2 is smaller than the value of DIST, and "0" if not. The output is input to the third AND circuit 413.

The fourth decision circuit 444 inputs the value S3 of the SCNT 202, decides the equality between S3 and zero (whether the value S3 of the SENT 202 is non-zero or not), and outputs "1" if S3 is non-zero, and "0" if zero. The output is input to the second OR circuit 422.

The first AND circuit 411 inputs both the output of the first decision circuit 441 and the inverse of the value S1 of the MODE 207, ANDs the two inputs, and outputs "1" if both the inputs are "1," and "0" if not. The output is input to the second AND circuit 412.

The second AND circuit 412 inputs both the output of the second decision circuit 442 and the output of the first AND circuit 411, ANDs the two inputs, and outputs "1" if both the inputs are "1," and "0" if not. The output is input to the first, third, and fourth OR circuits 421, 423, and 424.

The third AND circuit 413 inputs both the output of the third decision circuit 443 and the value S1 of the MODE 207, ANDs the two inputs, and outputs "1" if both the inputs are "1," and "0" if not. The output is input to the fourth AND circuit 414 and the fourth OR circuit 424.

The fourth AND circuit 414 inputs both the inverted value of the output of the third AND circuit 413 and the value S1 of the MODE 207, ANDs the two inputs, and outputs "1" if both the inputs are "1," and "0" if not. The output is input to the third OR circuit 423 and to the select control input of the fourth multiplexer 434.

The fifth AND circuit 415 inputs both the output of the fourth decision circuit 444 and the output of the first OR circuit 421, ANDs the two inputs, and outputs "1" if both the inputs are "1," and "0" if not. The output serves as the select control inputs of the respective first and third multiplexers 431 and 433 and the update value 303 of the SFLG 209.

The first OR circuit 421 inputs both the value of the "VALID" field in the transfer data 200 of the adjoining MBF 1211 of the adjoining PE 101 and the output of the second AND circuit 412, ORs the two inputs, and outputs "0" if both the inputs are "0," and "1" if not. The output is input to the fifth AND circuit 415.

The second OR circuit 422 inputs both the output of the second decision circuit 442 and the output of the fourth decision circuit 444, ORs the two inputs, and outputs "0" if both the inputs are "0," and "1" if not. The output serves as the STATUS 206.

The third OR circuit 423 inputs both the output of the second AND circuit 412 and the output of the fourth AND circuit 414, ORs the two inputs, and outputs "0" if both the inputs are "0," and "1" if not. The output serves as the select control input of the multiplexer 435.

The fourth OR circuit 424 inputs both the output of the second AND circuit 412 and the output of the third AND circuit 413, ORs the two inputs, and outputs "0" if both the inputs are "0," and "1" if not. The output serves as the select control input of the second multiplexer 432 and the update value 303 of the RFLG 208.

The first multiplexer 431 inputs both the transfer data 200 of the adjoining MBF 1211 of the adjoining PE 101 and the value S5 of the SBUF 205, and selects and outputs S5 if the output of the fifth AND circuit 415 or the select control input has a value of "0," and the transfer data 200 if "1." The output serves as the update value 305 of the MBF 121.

The second multiplexer 432 inputs both the transfer data 200 of the adjoining MBF 1211 of the adjoining PE 101 and the value S6 of the RBUF 204, and selects and outputs S6 if the output of the OR circuit 424 or the select control input has a value of "0," and the transfer data 200 if "1." The output serves as the update value 303 of the RBUF 204.

The third multiplexer 433 inputs both the output of the first subtractor circuit 451 and the value S3 of the SCNT 202, and selects and outputs S3 if the output of the fifth AND circuit 415 or the select control input has a value of "0," and the output of the first subtractor circuit 451 if "1." The output serves as the update value 304 of the SCNT 202.

The fourth multiplexer 434 inputs both "1" and the value of the DIST, and selects and outputs "1" if the output of the fourth AND circuit 414 or the select control input has a value of "0," and the value of the DIST if "1." The output is input to the second subtractor circuit 452.

The fifth multiplexer 435 inputs both the output of the second subtractor circuit 452 and the value S2 of the RCNT 203, and selects and outputs S2 if the output of the third OR circuit 423 or the select control input has a value of "0," and the output of the second subtractor circuit 452 if "1." The output serves as the update value 304 of the RCNT 203.

The first subtractor circuit 451 inputs both "1" and the value S3 of the SCNT 202, subtracts "1" from S3, and outputs the result of subtraction. The output is input to the third multiplexer 433.

The second subtractor circuit 452 inputs both the output of the fourth multiplexer 434 ("1" or "DIST") and the value S2 of the RCNT 203, subtracts the output of the fourth multiplexer 434 from S2, and outputs the result of subtraction. The output is input to the fifth multiplexer 435.

With the foregoing configuration, the combinational circuit part 301 controls the operation of inputting the values stored in the MBF 1211 of the adjoining PE 101 and several storing units of the own PE 101, generating the update value 305 of the MBF 121, the update values 303 of the RBUF 204, RFLG 208, and SFLG 209, and the update values 304 of the RCNT 203 and SCNT 202 at each cycle of issuance of the SSFT instruction 302 by the CP 110, and updating the values of the respective storing units with the update values 303 to 305. The update values of the respective storing units for the combinational circuit part 301 to generate and the update timing are summarized as follows:

1) Update of the MBF 121

The combinational circuit part 301 updates the contents of the MBF 121 with the contents S5 of the SBUF 205 as the update value 305 if "the value S1 of the MODE 207 designates a non-counter method (S1='0'), the value S3 of the SCNT 202 is non-zero (the output of the fourth decision circuit 444='1'), and the 'VALID' field which indicates the validity of the adjoining MBF 1211 has the value that indicates "invalid" (the output of the first OR circuit 421='1')," or if "the value S1 of the MODE 207 designates a non-counter method (S1='0'), the value S3 of the SCNT 202 is non-zero (the output of the fourth decision circuit 444='1'), and the RBUF 204 is updated with the contents 200 of the adjoining MBF 1211" (the output of the fifth AND circuit 415=the select control input of the first multiplexer 431="1"). In other cases (the output of the fifth AND circuit 415=the select control input of the first multiplexer 431="0"), the combinational circuit part 301 updates the contents of the MBF 121 with the contents 200 of the adjoining MBF 1211 as the update value 305.

2) Update of the RBUF 204

The combinational circuit 301 updates the contents of the RBUF 204 with the contents 200 of the adjoining MBF 1211 as the update value 303 if "the value S1 of the MODE 207 designates a non-counter method (S1='0'), the value S2 of the RCNT 202 is non-zero (the output of the second decision circuit 442='1'), and the value S4 of the IDB 210 coincides with the 'ID' field of the adjoining MBF 1211 (the output of the first decision circuit 441='1,' the output of the first AND circuit 411='1')," or if "the value S1 of the MODE 207 designates the counter method (S1='1'), and the value S2 of the RCNT 203 is smaller than the minimum grid distance (hereinafter, "DIST") of the inter-PE network (the output of the third decision circuit 443='1')" (the output of the fourth OR circuit 424=the select control input of the second multiplexer 432="1").

3) Update of the RCNT 203

The combinational circuit 301 updates the value of the RCNT 203 with the value S2 of the RCNT 203 minus "1" (RCNT−1: the output of the second subtractor circuit 452) as the update value 304 if "the value S1 of the MODE 207 designates a non-counter method (S1='0'), and the contents of the RBUF 204 are updated with the contents 200 of the adjoining MBF 1211 (the output of the fourth OR circuit 424="1," the output of the fourth AND circuit 414=the select control input of the fifth multiplexer 435="0"). The combinational circuit part 301 updates the value of the RCNT 203 with the value S2 of the RCNT 203 minus the value of the DIST (RCNT−DIST: the output of the second subtractor circuit 452) as the update value 304 if "the value S1 of the MODE 207 designates the counter method (S1='1'), and the value S2 of the RCNT 203 is greater than or equal to the DIST (the output of the third decision circuit 443='1')" (the output of the third AND circuit 413="1," the output of the fourth AND circuit 414=the select control input of the fifth multiplexer 435="1").

4) Update of the SCNT 202

The combinational circuit part 301 updates the value of the SCNT 202 with the value S3 of the SCNT 202 minus 1 (SCNT−1: the output of the first subtractor circuit 451) as the update value 304 if "the contents of the MBF 121 are updated with the contents S5 of the SBUF 205" (the output of the fifth AND circuit 415=the select control input of the third multiplexer 433="1").

5) Update of the RFLG 208

The combinational circuit part 301 updates the value of the RFLG 208 with "1" as the update value if "the contents of the RBUF 204 are updated with the contents 200 of the adjoining MBF 1211" (the output of the fourth OR circuit=the select control input of the second multiplexer="0"). In other cases (the output of the fourth OR circuit=the select control input of the second multiplexer="1"), the combinational circuit part 301 updates the value of the RFLG 208 with "0" as the update value 303.

6) Update of the SFLG 209

The combinational circuit part 301 updates the value of the SFLG 209 with "1" as the update value if "the contents of the MBF 121 are updated with the contents S5 of the SBUF 205" (the output of the fifth AND circuit 415=the select control input of the first multiplexer 431="1"). In other cases (the output of the fifth AND circuit 415=the select control input of the first multiplexer 431="0"), the combinational circuit part 301 updates the value of the SFLG 209 with "0" as the update value 303.

7) Update of the FFLG 211

The combinational circuit part 301 updates the value of the FFLG 211 through the OR circuit 420 with "1" as the update value if "any one of the values S2 of the RCNT 203 and the values S3 of the SCNT 202 of all the PEs 101 participating in the data transfer operation is non-zero (the output of the second OR circuit 422=the value of the STATUS 206='1')."
In other cases (the output of the second OR circuit 422=the value of the STATUS 206='0'), the combinational circuit part 301 updates the value of the FFLG 211 through the OR circuit 420 with "0" as the update value.

Next, the effects of the present example will be described. According to the present example, it is possible to use the "counter method," in which the connection lines 120 and the MBFs 121 have high use efficiency, when the SIMD processor array system performs data transfer only once between PEs 101 all of which are located at different distances and if the grid distance to the source PE 101 is previously known to the receiving side. In other cases, it is possible to transfer data by using the "source ID method" or the "destination ID method" which can improve the network availability, i.e., in which the connection lines 120 and the MBFs 121 have high use efficiency over the time direction.

Since the foregoing effect is provided not by background operations but by repeating the issuance of the SSFT instruction through explicit program control, the buffers and other storing units needed in the present example can be implemented by utilizing part of the existing general-purpose registers and the like that the PEs 101 typically have. The only components to be newly added are the simple combinational circuits for controlling the update timing of the buffers and generating the update values.

Consequently, the present example can provide the effect that can implement data transfer functions of low hardware cost, high efficiency, and high flexibility between the PEs 101 which are located at different distances.

It should be noted that if the number of pieces of transmission data (=SCNT value) is smaller than the number of pieces of reception data (=RCNT value) in each PE 101, the SCNT 202 may be set to the same value as that of the RCNT 203, which is greater than the actual value. In such a case, extra pieces of transmission data as many as the value of the RCNT 203 minus the value of the SCNT 202 (RCNT−SCNT) are needed. Here, transmission data having an invalid-indicating value in the "VALID" field may be prepared in the IMEM 221. When a receiving operation occurs, the invalid transmission data prepared in the IMEM 221 is stored into the own MBF 121 even if there actually is no such data to be transmitted. This can increase the chances of data transmission by other PEs 101 that have greater numbers of pieces of transmission data. With the "source ID method," such an operation shall be disabled. This provides the advantage that it is possible to broadcast the same data from the same source to a large number of PEs 101.

Example 2

Now, a second example of the present invention will be described. The same components as in the first example will be designated by like reference signs, and description thereof will be omitted.

In the present example, a group of PEs 101 that only perform reception may be excluded from data transmission if such PEs 101 can be identified at the time of hardware designing. In such a case, the SCNT 202, the SBUF 205, and the SFLG 209 are not needed. The NCTL 201 controls the update timing of the MBF 121, RBUF 204, RCNT 203, RFLG 208, and FFLG 211 and generates the update values as described below at cycles when the SSFT instruction 302 is issued by the CP 110.

1) Update of the MBF 121

The NCTL 201 updates the MBF 121 with the contents of the adjoining MBF 1211 as the update value.

2) Update of the RBUF 204

The NCTL 201 updates the contents S6 of the RBUF 204 with the contents 200 of the adjoining MBF 1211 as the update value 305 if "the value S1 of the MODE 207 designates a non-counter method, the RCNT 203 has a non-zero value, and the value of the IDB 210 coincides with the value of the 'ID' field of the adjoining MBF 1211," or if "the value S1 of the MODE 207 designates the counter method, and the value S2 of the RCNT 203 is smaller than the minimum grid distance DIST of the inter-PE network."

3) Update of the RCNT 203

The NCTL 201 updates the value S3 of the RCNT 203 with the value of the RCNT 203 minus 1 (RCNT−1) as the update value 304 if "the value S1 of the MODE 207 designates a non-counter method and the contents of the RBUF 204 are updated with those of the adjoining MBF 1211." The NCTL 201 updates the value S3 of the RCNT 203 with the value of the RCNT 203 minus that of the DIST (RCNT−DIST) as the update value 304 if "the value S1 of the MODE 207 designates the counter method and the value S2 of the RCNT 203 is greater than or equal to DIST."

4) Update of the RFLG 208

The NCTL 201 updates the value of the RFLG 208 with "1" as the update value 303 if "the contents of the RBUF 204 are updated with the contents 200 of the adjoining MBF 1211." In other cases, the NCTL 201 updates the value of the RFLG 208 with "0" as the update value 303.

5) Update of the FFLG 211

The NCTL 201 updates the FFLG 211 with "1" as the update value if "any one of the RCNTs 203 and SCNTs 202 of all the PEs 101 participating in the data transfer operation is non-zero." In other cases, the NCTL 201 updates the FFLG 211 with "0" as the update value.

Example 3

Next, a third example of the present invention will be described. The same components as in the first example will be designated by like reference signs, and description thereof will be omitted.

In the present example, either the SCNT 202 or the RCNT 203 is omitted. For example, only the RCNT 203 is left for use, assuming that the SCNT 202 and the RCNT 203 always have the same value. This can somewhat simplify the configuration of the NCTL 201.

Note that if the number of pieces of data originally intended to be transmitted is smaller than the number of pieces of reception data, it is sometimes needed, from an operational point of view, to prepare extra pieces of transmission data having an invalid-indicating value in the "VALID" field in the IMEM 221 as many as lack. Similarly, if the number of pieces of data originally intended to be received is smaller than the number of pieces of transmission data, it is sometimes needed to prepare a space for storing the extra pieces of reception data in the IMEM 221.

Example 4

Next, a fourth example of the present invention will be described. The same components as in the first example will be designated by like reference signs, and description thereof will be omitted.

In the present example, the configuration of the NCTL 201 where pertaining to the update control on the MBF 121 and the generation of the update value is modified as described below. As a result, even if the number of pieces of data to be transmitted is smaller than the number of pieces of reception data, invalid transmission data is automatically stored into the MBF 121 upon the occurrence of reception, i.e., when the RBUF 204 is updated. This eliminates the need for the space on the IMEM 221 for storing the invalid transmission data in advance.

1) Update of the MBF 121

The NCTL 201 updates the MBF 121 with the contents of the SBUF 205 as the update value 305 if "the value S1 of the MODE 207 designates a non-counter method, the SCNT 202 is non-zero, and the 'VALID' field which indicates the validity of the adjoining MBF 121 has the value that indicates invalid," or if "the value S1 of the MODE 207 designates a non-counter method, the SCNT 202 is non-zero, and the contents of the RBUF 204 are updated with those of the adjoining MBF 1211." The NCTL 201 updates the MBF 121 with arbitrary invalid-indicated transmission data as the update value 305 if "the value S1 of the MODE 207 designates a non-counter method, the SCNT 202 is zero, and the contents of the RBUF 204 are updated with those of the adjoining MBF 1211." In other cases, the NCTL 201 updates the MBF 121 with the contents of the adjoining MBF 1211 as the update value 305.

Example 5

Next, a fifth example of the present invention will be described. The same components as in the first example will be designated by like reference signs, and description thereof will be omitted.

In the present example, the configuration of the NCTL 201 pertaining to the update control on the RBUF 204 and the generation of the update value is modified. As a result, even if the number of pieces of data to be transmitted is smaller than the number of pieces of reception data, invalid transmission data is automatically stored into the MBF 121 upon the occurrence of reception, i.e., when the RBUF 204 is updated. This can eliminate the need for the space on the IMEM 221 for storing invalid transmission data, thereby reducing the needed size of the memory area of the IMEM 221.

Example 6

Next, a sixth example of the present invention will be described. The same components as in the first example will be designated by like reference signs, and description thereof will be omitted.

In the present example, the configuration of the NCTL 201 pertaining to the generation of the update value of the RBUF 204 is added and modified so that the contents of the "DATA" field, not the entire contents of the MBF 121, can be used alone as the update value of the RBUF 204. This can reduce the size of a memory area of the IMEM 221 that needs to be reserved for storing the reception data.

Example 7

Next, a seventh example of the present invention will be described. The same components as in the first example will be designated by like reference signs, and description thereof will be omitted.

In the present example, not the whole fields but only the "DATA" field of the transmission data is stored into the IMEM 221 so that the "source ID method" can be suitably used. The configuration of the NCTL 201 is added and modified so that when updating the SBUF 205, the ID of the own PE can be automatically filled into the "ID" field and a valid-indicating value into the "VALID" field in addition to the "DATA" field that is read from the IMEM 221, and the resultant is stored into the SBUF 205. This can reduce the size of the memory area of the IMEM 221 that is needed to store the transmission data when in the "source ID method."

Example 8

Next, an eighth example of the present invention will be described. The same components as in the first example will be designated by like reference signs, and description thereof will be omitted.

In the SIMD processor array system according to the present example, the CP 110 has an instruction set that includes a conditional branch instruction (hereinafter, "BRC instruction"), a conditional store instruction (hereinafter, "STC instruction"), and a conditional load instruction (hereinafter, "LDC instruction") aside from the foregoing SSFT instruction.

Hereinafter, the cases of 1) performing data transfer only once and 2) successively performing data transfer a plurality of times between PEs 101 located at different distances will be described separately.

1) When Performing Data Transfer Only Once (FIGS. 4 to 7)

Figures 4, 5:
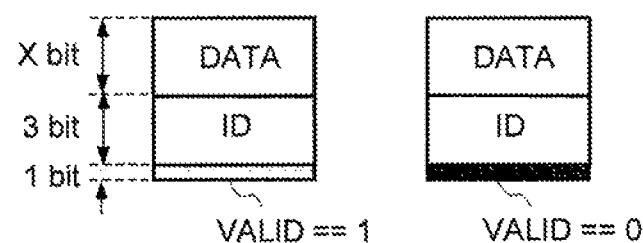
FIG. 4 A diagram showing program code for explaining the operation of performing data transfer only once between PEs located at different distances in the SIMD processor array system according to the eighth example of the present invention.
FIG. 5 A diagram showing the format of the transfer data for use in the SIMD processor array system according to the eighth example of the present invention.

Initially, when performing data transfer only once between PEs 101 that are located at different distances, operations such as shown by the program code of FIG. 4 are performed. In the description of the program code shown in FIG. 4, " . . . " specifies that the instructions on both sides make operation in the same cycle. "%" specifies which condition flag for the conditional instruction to refer to. A character string ending with ":" represents the address of the location where the character string occurs. If the label is specified as an operand of a branch instruction, it means that the address is designated. Comments are enclosed with "/*" and "*/".

When performing the operation described by the program code shown in FIG. 4, the CP 110 executes the SSFT instruction written in the first line "/* address A */." If the resulting value of the FFLG 211 is "1," the branching occurs when the BRC instruction written in the second line "/* address A+1*/" is executed. At the next cycle, the CP 110 makes operation to jump to the first line "/* address A */," not the third line "/* address A+3*/." On the other hand, if the value of the FFLG 211 is "0," the CP 110 proceeds to the third line "/* address A+3*/" without branching, thereby exiting the loop. Marked with " . . . ", the SSFT instruction written in "/* address A+2*/" is executed simultaneously with the BRC instruction. Consequently, the SSFT instruction is executed at each cycle until the CP 110 exits the loop.

Next, description will be given of the case where the operation described by the program code shown in FIG. 4 is executed.

FIG. 5 shows the contents stored in the MBFs 121 of respective PEs 101 in an initial state. In the MBFs 121 of the shown example, the "DATA" field has X bits. The "ID" field has three bits which correspond to the number of PEs 101, eight. The "VALID" field has one bit. In the example, the "VALID" field is shown filled if the value is "0," and left blank if "1."

Figure 6:
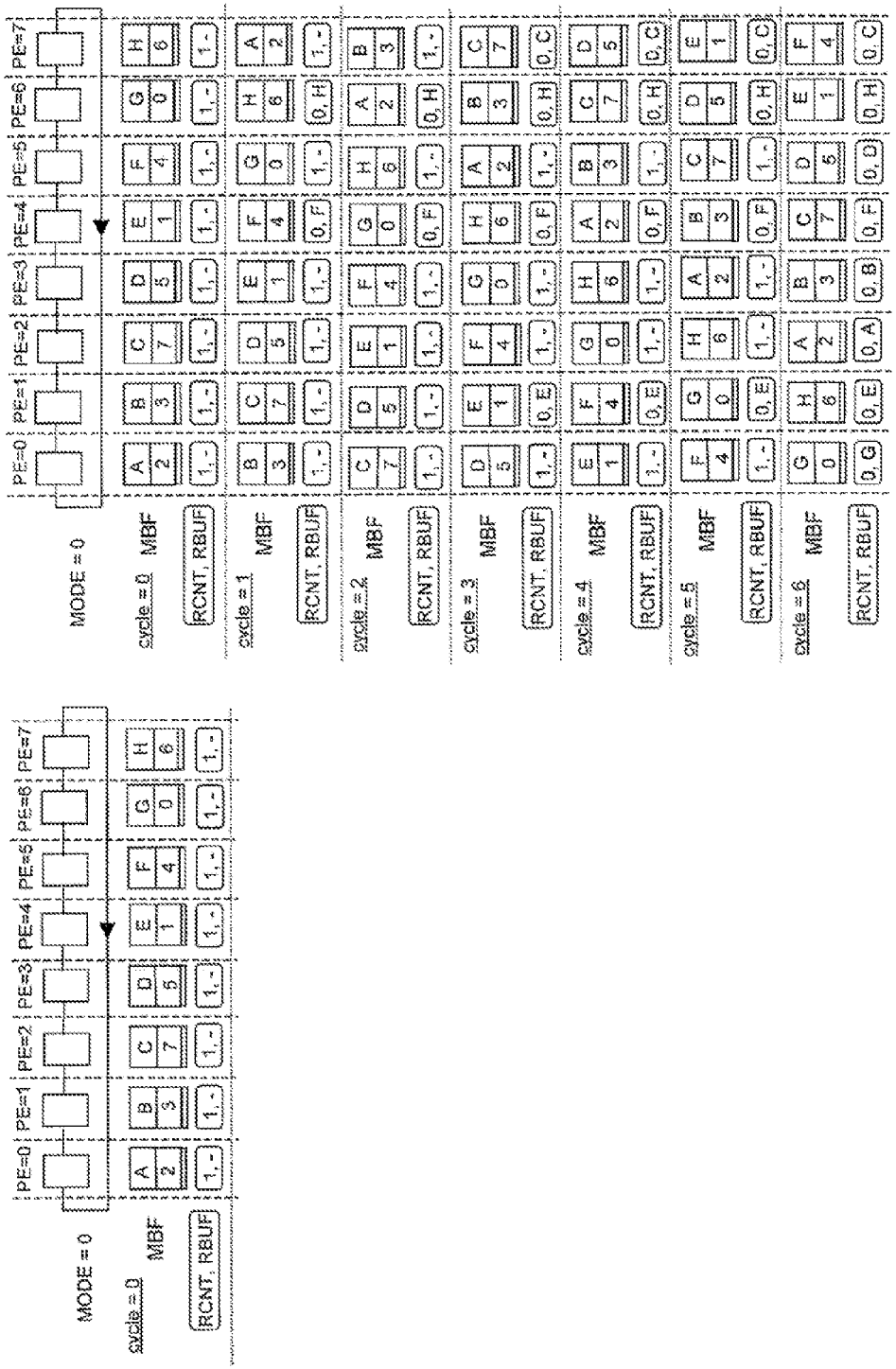
FIG. 6 A diagram for explaining an initial state for performing data transfer only once between PEs located at different distances by using a destination ID method and the result of operation at each subsequent cycle in the SIMD processor array system according to the eighth example of the present invention.

1-1) Destination ID Method (FIG. 6)

Referring to FIG. 6, the operation of performing data transfer only once between PEs 101 located at different distances by using the "destination ID method" will be described for the case where the number of PEs 101 is eight (PE=0 to 7).

In the initial state of each PE 101 (PE=0 to 7) at the zeroth cycle (cycle=0) shown to the left in FIG. 6, the "DATA," "ID," and "VALID" fields of the MBF 121 contain the shown initial values, and the RCNT 203 and RBUF 204 contain the shown initial values (RCNT, RBUF). In the example, each PE 101 receives data only once. The initial value of the RCNT 203 is thus "1." The initial value of the RBUF 204 is "–" which means an arbitrary value.

Starting from the initial state, the CP 110 issues the SSFT instruction to control the operation of each PE 101 according to the description of the program code shown in FIG. 4. The values of the MBF 121, RCNT 203, and RBUF 204 of each PE 101 change at each cycle from the zeroth cycle to the sixth cycle (cycle=1 to 6) as shown to the right in FIG. 6.

As a result, after the sixth cycle of operation, the RCNTs 203 of all the PEs 101 are zero. When the CP 110 subsequently executes the BRC instruction according to the program code shown in FIG. 4, it does not branch to address A but moves execution to address A+3 to exit the loop. It can be seen that the RBUF 204 of each PE 101 here contains the entire contents of the MBF 121 (in the shown example, only the data in the "DATA" field is displayed because of space limitations) of an PE 101 by which the own PE is designated as a destination in the initial state on the left of FIG. 6.

For example, in the initial state on the left of FIG. 6 (cycle=0), it is expected from the contents of the MBF 121 ("DATA"="A," "ID"="2," and "VALID"="1") that the zeroth PE 101 (PE=0) operates to deliver the data "A" to the second PE 101 (PE=2). At the sixth cycle on the right of FIG. 6 (cycle=6), the contents of the RBUF 204 of the second PE 101 (PE=2) show that the data "A" is finally stored.

As in the foregoing example, when transferring data between PEs 101 located at different distances by using the "destination ID method," the number of bits of data that can be transmitted and received between the PEs 101 is X even if the MBFs 121 of X+4 bits are provided. On the other hand, if the "counter method" is used for data transfer between the PEs 101 located at different distances, the same transfer as in FIG. 5 can be performed with MBFs 121 of X bits, not X+4 bits.

Figure 7:
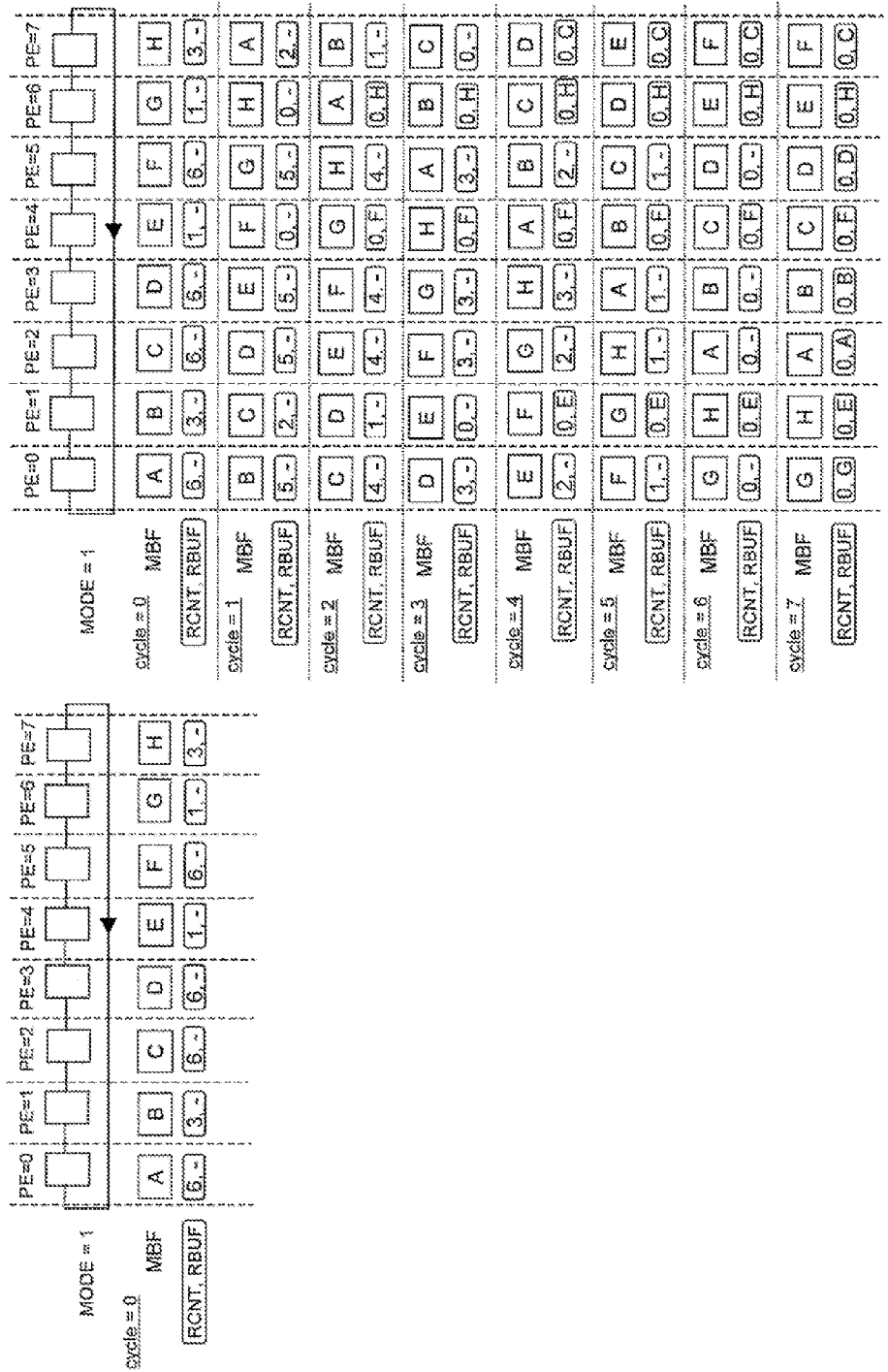
FIG. 7 A diagram for explaining an initial state for performing data transfer only once between PEs located at different distances by using a counter method and the result of operation at each subsequent cycle in the SIMD processor array system according to the eighth example of the present invention.

1-2) Counter Method (FIG. 7)

FIG. 7 shows an example where the same data transfer as in the example of FIG. 6 is performed by using the "counter method" with the same source PEs and receiving PEs.

As shown in the initial state (zeroth cycle (cycle=0)) on the left of FIG. 7, each PE 101 here sets the grid distance DIST from itself to a source PE 101 as the initial value of the RCNT 203. It can be seen from the final result on the right of FIG. 7 that the same result of transfer as shown to the right in FIG. 6 is obtained after the seventh cycle (cycle=7) of operation, though with an additional cycle as compared to the case of the "destination ID method" of FIG. 6.

2) When Successively Performing Data Transfer a Plurality of Times (FIGS. 8 to 11)

Next, description will be given of the case of successively performing data transfer a plurality of times between PEs that are located at different distances. Here, the program code shown in FIG. 8 shall be used.

In the program code shown in FIG. 8, the LCD instruction and the STC instruction are specified to be executed on the conditions of the RFLG 208 and SFLG 209, respectively, each time the SSFT instruction is executed. Suppose that the value of the RFLG 204 is set to "1" as a result of the SSFT instruction that is executed in the previous cycle. In the next cycle, the reception data stored in the RBUF 204 is then stored into a predetermined location in the IMEM 221 (in the shown example, an address with "RADR" as the base address of the IMEM 221 and the RCNT 203 as the offset) by the STC instruction.

Similarly, if the value of the SFLG 209 is set to "1," the LDC instruction is enabled in the same cycle, whereby new transmission data is loaded into the SBUF 205 from a predetermined location of the IMEM 221 (in the shown example, an address with "SADR" as the base address of the IMEM 221 and the SCNT 202 as the offset) in the next cycle. If the value of the FFLG 221 on the CP 110 is "0," the loop is exited, and the STC instruction starting with "/* address A+7*/" is executed.

Consequently, the data that is the last received and stored in the RBUF 204 is stored into a predetermined location in the IMEM 221 (here, the location is at address "RADR+0" since the value of the RCNT 203 is "0").

Figure 9:
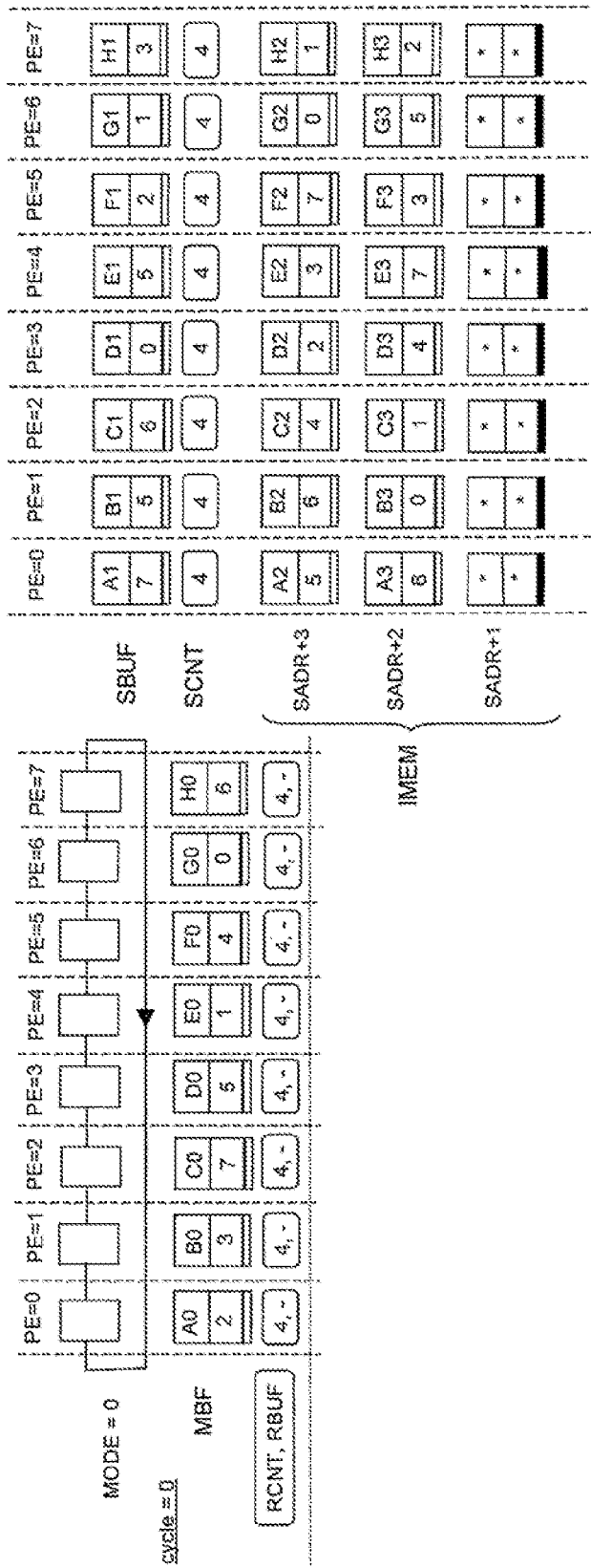
FIG. 9 A diagram for explaining an initial state for successively performing data transfer a plurality of times between PEs located at different distances by using the destination ID method in the SIMD processor array system according to the eighth example of the present invention.
Figure 10:
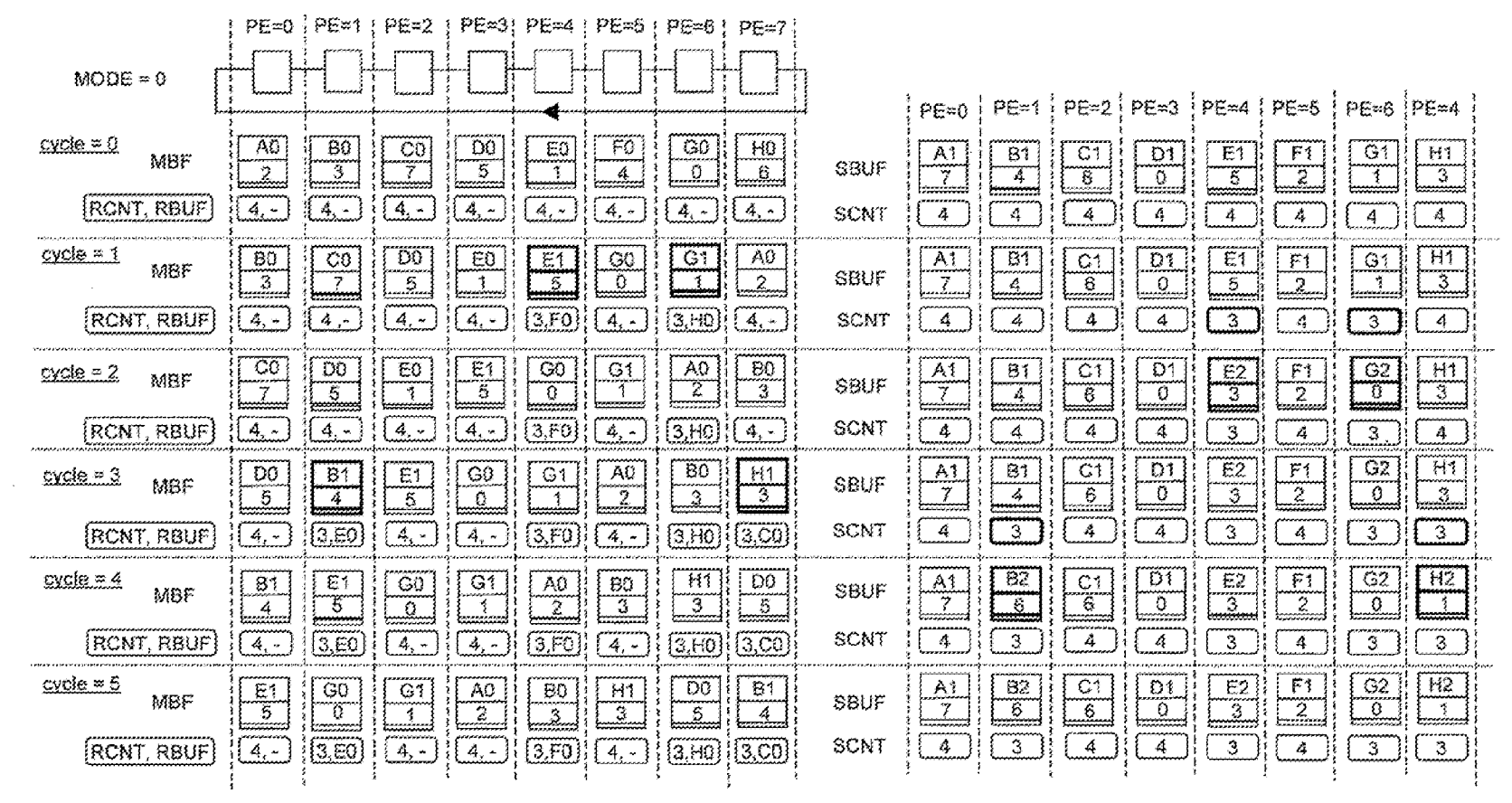
Figure 11:
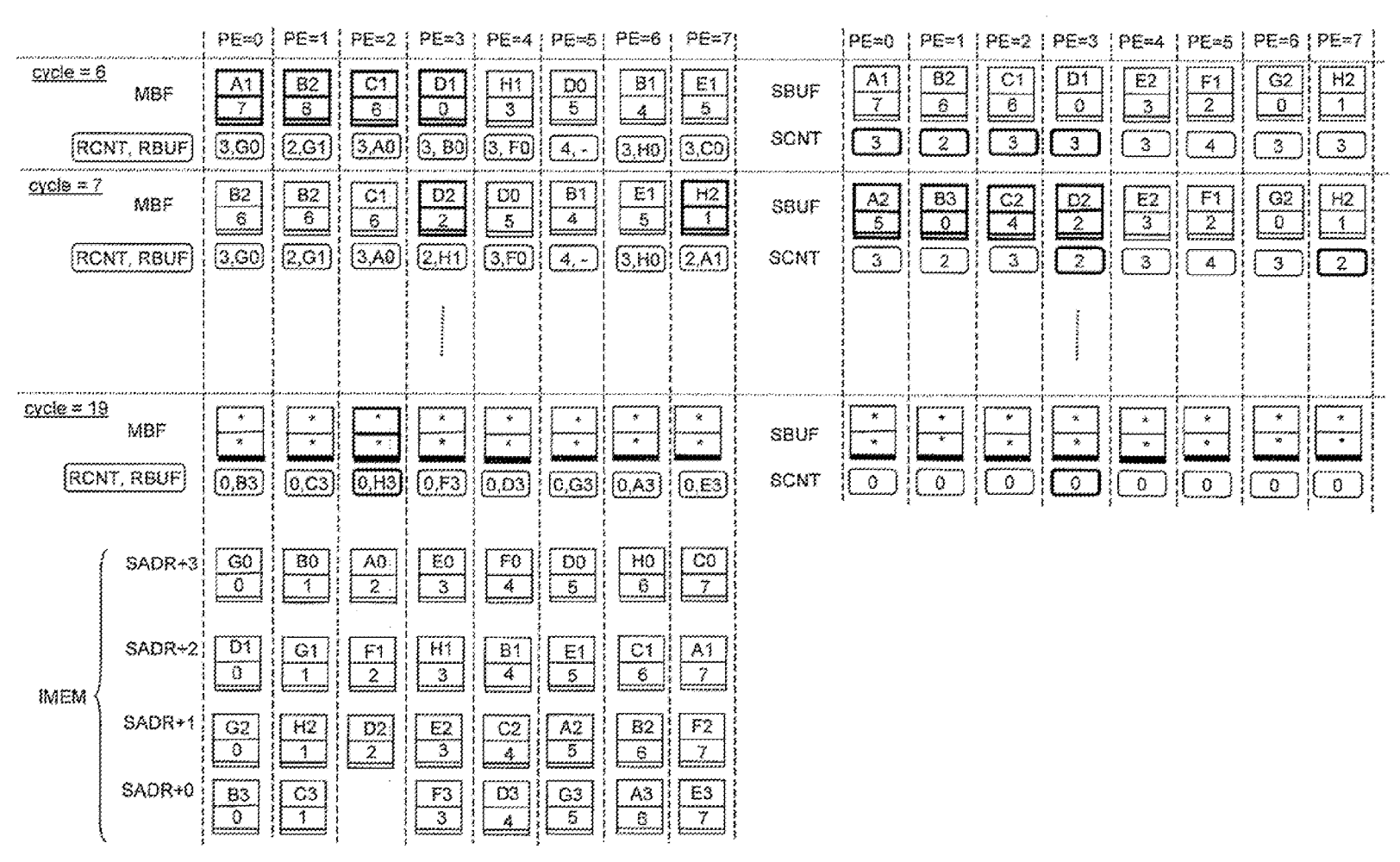
Figure 12:
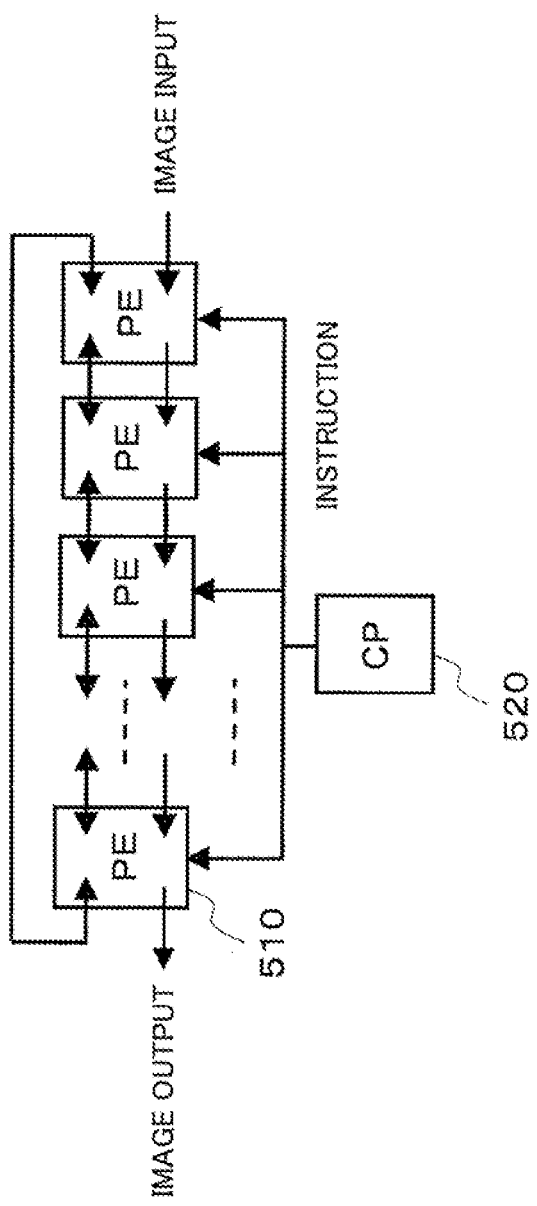
FIG. 12 A block diagram showing the general configuration of an SIMD processor array system according to a relevant technology.

2-1) Destination ID Method (FIGS. 9 to 11)

Description will be given of the case of transferring four pieces of data according to the program code of FIG. 8, using the "destination ID method."

In the initial state at the zeroth cycle (cycle=0) shown in FIG. 9, each PE 101 has four pieces of transmission data (A0 to A3, B0 to B3, . . . , H0 to H3) paired with a destination ID. Of the four pieces of transmission data, the first piece of data (A0, B0, . . . , H0) is stored in the MBF 121 as shown to the left in FIG. 9. The second piece of data (A1, B1, . . . , H1) is stored in the SBUF 205 as shown to the upper right in FIG. 9. The third piece of data (A2, B2, . . . , H2) and the fourth piece of data (A3, B3, . . . , H3) are stored at addresses "SADR+3" and "SADR+2" in the IMEM 221, respectively, as shown to the lower right in FIG. 9. In addition, invalid transmission data having an ON (invalid) value in its "VALID" field is stored at address "SADR+1" in the IMEM 221 as shown to the lower right in FIG. 9. The RCNT 203 and the SCNT 202 are set to "4" as shown to the left and the upper right in FIG. 9, respectively.

Next, the processing proceeds from the initial state shown in FIG. 9, and after the nineteenth cycle (cycle=19) of operation, as shown in FIGS. 10 and 11, four pieces a PE 101 or a total of 8☐4=32 pieces of transmission data are delivered to the respective destination PEs 101. At the next cycle of processing, the data in the RBUF 204 of the second PE 101 (PE=2), which is the last received, is written into address "RADR+0" in the IMEM 221 (in the shown example, the twentieth cycle is not shown).

To facilitate visualization of the update timing, in the example shown in FIGS. 10 and 11, an MBF 121 is boxed in bold lines when the MBF 121 is updated with the contents of the SBUF 205. An SBUF 205 is boxed in bold lines if the contents of the SBUF 205 are updated by an "LCD instruction." An SCNT 202 is circled in a bold line if the SCNT 202 is updated.

2-2) Counter Method

FIGS. 10 and 11 have dealt with the case where the destination ID method is used. Consider now the operation where each PE 101 similarly has four pieces of data to transfer, and transfer is sequentially performed four times by using the "counter method," for example. In such a case, the operation takes 7+8+7+8=30 cycles, even ignoring the number of cycles that are needed to set the initial values into the buffers prior to each data transfer.

In contrast, when the four pieces of data to be transferred are transferred in a superposed form by using the "destination ID method," the transfer completes in 20 cycles as shown in FIGS. 10 and 11. In such an example, the use of the "destination ID method" can achieve approximately 33% of speedup as compared to when the "counter method" is used.

The speed-up effect resulting from the superposition of the data transfer through the use of the "destination ID method" is typically expected to be more pronounced as the number of pieces of data to be successively transferred increases.

According to the exemplary embodiment and examples of the present invention described above, it becomes possible to provide an SIMD processor array which can achieve efficiently data transfer between PEs that are located at different distances. It therefore becomes possible at low cost to reduce the processing load of various image processing and signal processing where data needs to be exchanged between PEs. As a result, it is possible to further promote the applications of the SIMD processor array, which is inherently characterized by low cost and high performance, without impairing the low cost.

Up to this point, the present invention has been described with reference to the exemplary embodiment, whereas the present invention is not limited to the foregoing exemplary embodiment. Various modifications understandable to those skilled in the art may be made to the configuration and details of the invention within the scope of the invention.

INDUSTRIAL APPLICABILITY

The present invention may be applied to an SIMD processor array system which includes a plurality of mutually-connected processing elements to be controlled by a control processor that is capable of issuing a plurality of instructions at the same time, and a data transfer method thereof.

The invention claimed is:

1. An SIMD processor array system comprising:
a control processor that is capable of issuing a plurality of instructions at the same time; and
a processing element array that includes a plurality of mutually-connected processing elements to be controlled by the control processor,
the control processor issuing an inter-processing element data shift instruction to the plurality of processing elements,
the plurality of processing elements having a transfer data storing part, a transfer data fetch and storing part, and an ID storing part, and according to the inter-processing element data shift instruction, performing a data sending operation of copying all contents of the transfer data storing part of an adjoining processing element to the transfer data storing part of the own processing element, and a data fetch operation of copying part or all of the contents of the transfer data storing part of the adjoining processing element to the transfer data fetch and storing part of the own processing element if part of the contents of the transfer data storing part of the adjoining processing element coincide with contents of the ID storing part of the own processing element.

2. The SIMD processor array system according to claim 1, wherein
the plurality of processing elements have a transmission data storing part, and according to the inter-processing element data shift instruction, perform a data sending operation of copying contents of the transmission data storing part of the own processing element to the transfer data storing part of the own processing element if part of the contents of the transfer data storing part of the adjoining processing element coincide with the contents of the ID storing part of the own processing element or if the contents of the transfer data storing part of the adjoining processing element are invalid, and copying all the contents of the transfer data storing part of the adjoining processing element to the transfer data storing part of the own processing element if not coincide.

3. The SIMD processor array system according to claim 1, wherein the plurality of processing elements have a transmission success flag, and according to the inter-processing element data shift instruction, perform the operation of setting the transmission success flag on the own processing element ON if the contents of the transmission data storing unit of the own processing element are copied to the transfer data storing part of the own processing element.

4. The SIMD processor array system according to claim 1, wherein the plurality of processing elements have a reception number counter, and according to the inter-processing element data shift instruction, perform a data fetch operation of copying part or all of the contents of the transfer data storing part of the adjoining processing element to the transfer data fetch and storing part of the own processing element and decrementing the reception number counter by one if the reception number counter of the own processing element is non-zero and part of the contents of the transfer data storing part of the adjoining processing element coincide with the contents of the ID storing part of the own processing element.

5. The SIMD processor array system according to claim 1, wherein the plurality of processing elements have a reception success flag, and according to the inter-processing element data shift instruction, perform the operation of setting the reception success flag on the own processing element ON if part or all of the contents of the transfer data storing part of the adjoining processing element are copied to the transfer data fetch and storing part of the own processing element.

6. The SIMD processor array system according to claim 1, wherein the plurality of processing elements have a reception number counter, and according to the inter-processing element data shift instruction, perform the operation of updating a data transfer flag on the control processor so that the data transfer flag is ON if at least one of the reception number counters of processing elements participating in the data transfer operation is non-zero, and OFF if not.

7. The SIMD processor array system according to claim 1, wherein the plurality of processing elements have a transmission number counter, and according to the inter-processing element data shift instruction, perform the operation of updating a data transfer flag on the control processor so that the data transfer flag is ON if at least one of the transmission number counters of processing elements participating in the data transfer operation is non-zero, and OFF if not.

8. The SIMD processor array system according to claim 1, wherein the plurality of processing elements have a reception number counter and a transmission number counter, and according to the inter-processing element data shift instruction, perform the operation of updating a data transfer flag on the control processor so that the data transfer flag is ON if at least one of the reception number counters and transmission number counters of processing elements participating in the data transfer operation is non-zero, and OFF if not.

9. The SIMD processor array system according to claim 1, wherein the plurality of processing elements have a mode register, a reception number counter, and a reception success flag, and according to the inter-processing element data shift instruction, perform the operation according to claim 1 if the operation mode register contains an OFF value, and perform a data fetch operation if the operation mode register contains an ON value, the data fetch operation including copying part or all of the contents of the transfer data storing part of the adjoining processing element to the transfer data fetch and storing part of the own processing element and changing the reception success flag to OFF and the reception number counter to zero when the reception number counter of the own processing element is smaller than a grid distance to the adjoining processing element and the reception success flag is OFF, and decrementing the reception number counter by the grid distance when the reception number counter is greater than or equal to the grid distance.

10. A data transfer method of an SIMD processor array system, the method comprising:

issuing, with use of a control processor, an inter-processing element data shift instruction to a plurality of mutually-connected processing elements of a processing element array to be controlled by the control processor, the control processor being capable of issuing a plurality of instructions at the same time; and according to the inter-processing element data shift instruction, performing, with use of the plurality of processing elements, a data sending operation of copying all contents of a transfer data storing part of an adjoining processing element to a transfer data storing part of the own processing element, and a data fetch operation of copying part or all of the contents of the transfer data storing part of the adjoining processing element to a transfer data fetch and storing part of the own processing element if part of the contents of the transfer data storing part of the adjoining processing element coincide with contents of an ID storing part of the own processing element.

* * * * *